(12) United States Patent
Shakeri

(10) Patent No.: US 10,506,104 B1
(45) Date of Patent: Dec. 10, 2019

(54) IDENTITY VERIFICATION USING BLOCKCHAIN TECHNOLOGY

(71) Applicant: SAP SE, Walldorf (DE)

(72) Inventor: Mehran Shakeri, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/203,514

(22) Filed: Nov. 28, 2018

(51) Int. Cl.
*H04L 29/06* (2006.01)
*G06F 21/44* (2013.01)
*H04M 7/00* (2006.01)
*H04M 3/436* (2006.01)
*H04M 3/42* (2006.01)
*H04L 9/08* (2006.01)
*H04L 9/06* (2006.01)
*H04L 9/32* (2006.01)

(52) U.S. Cl.
CPC ........ *H04M 7/0078* (2013.01); *H04L 9/0637* (2013.01); *H04L 9/0825* (2013.01); *H04L 9/3247* (2013.01); *H04M 3/42042* (2013.01); *H04M 3/42059* (2013.01); *H04M 3/436* (2013.01); *H04L 2209/38* (2013.01); *H04M 2203/6027* (2013.01); *H04M 2203/6045* (2013.01)

(58) Field of Classification Search
CPC ..... H04W 12/06; H04W 12/04; H04W 12/10; H04W 12/08; H04W 8/24; H04W 12/02; H04M 7/0078
See application file for complete search history.

(56) References Cited

U.S. PATENT DOCUMENTS

| | | | |
|---|---|---|---|
| 2018/0176228 A1* | 6/2018 | He | H04L 63/105 |
| 2019/0097998 A1* | 3/2019 | Wang | H04L 63/10 |
| 2019/0188657 A1* | 6/2019 | Arora | G06Q 20/0658 |
| 2019/0228407 A1* | 7/2019 | Wu | G06Q 20/36 |

* cited by examiner

*Primary Examiner* — Gary Lafontant
(74) *Attorney, Agent, or Firm* — Mintz Levin Cohn Ferris Glovsky and Popeo, P.C.

(57) ABSTRACT

Systems and methods for using blockchain technology for the purpose of securely identifying parties to a communication. The method may comprise receiving a request to establish a communications connection between a first entity and a second entity in a telephony environment and writing a first digital identity associated with the first entity to a first data block in an immutable chain of blocks, in response to determining that the first entity is recognizable as a trusted entity. The blocks may be associated according to a defined cryptographic relationship. A second digital identity associated with the second entity may be written to a second data block in the immutable chain of blocks, in response to determining that the second entity is unrecognizable as a trusted entity.

20 Claims, 4 Drawing Sheets

IDENTITY VERIFICATION USING BLOCKCHAIN TECHNOLOGY

TECHNICAL FIELD

The disclosed subject matter generally relates to information security and, more particularly, to using blockchain technology for the purpose of securely identifying parties to a communication.

BACKGROUND

Information security technologies have been developed that can help safely store data in a storage system. Such technologies may be also configured to prevent unauthorized access to data by shielding the storage system's vulnerabilities against attackers. Regardless of how effective these security technologies are, an attacker may still be able to gain access to protected data by establishing a trusting relationship with an authorized user by, for example, pretending to be a person with authority. For instance, during a voice call, an attacker may pretend to be a representative of a well-known company or service provider and try to ask for sensitive data like passwords, credit card numbers or other confidential information by way of intimidation or providing false incentives to an unsuspected victim.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, systems and methods are provided for using blockchain technology for the purpose of securely identifying parties to a communication. The method may comprise receiving a request to establish a communications connection between a first entity and a second entity in a telephony environment and writing a first digital identity associated with the first entity to a first data block in an immutable chain of blocks, in response to determining that the first entity is recognizable as a trusted entity. The blocks may be associated according to a defined cryptographic relationship.

A second digital identity associated with the second entity may be written to a second data block in the immutable chain of blocks, in response to determining that the second entity is unrecognizable as a trusted entity. The first entity may be configured to receive a request to verify whether the second entity is trustworthy. The first entity verifying trustworthiness of the second entity by way of endorsing the second digital entity written to the second data block. The endorsing may comprise digitally signing the second digital identity with a private key of the first digital entity.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Caller identification mechanisms may be available that determine the identity of a caller. Such mechanisms may be implemented over a centralized system, which is usually owned by a telecommunications company that manages the calls and controls user registration, phone number assignment and the caller identification features. Registration of authorized users and maintaining the security and integrity of data in such systems may be associated with a substantial level of overhead and be expensive. Furthermore, disadvantageously, verification of the identity of a caller may be dependent on only a few points of authentication within the centralized system itself, with no external checks and balances.

Figure 1:
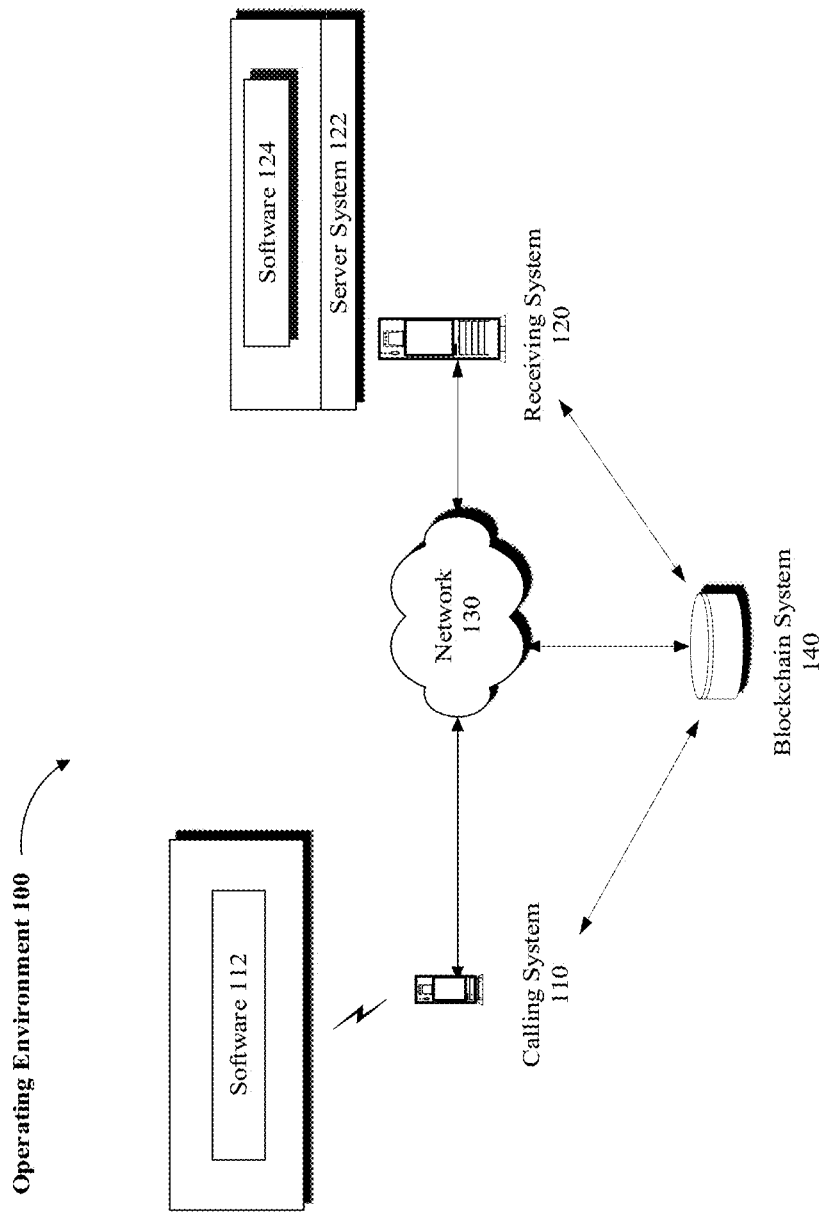
FIG. 1 is a block diagram of an example operating environment, in accordance with one or more embodiments, wherein two parties or systems may engage in communication.

Referring to FIG. 1, an example operating environment 100 is illustrated in which a calling system 110 may be used by a user who may interact with a user interface (e.g., software 112) of calling system 110 to initiate a communication connection with receiving system 120. The calling system 110 may be a telephony device, a general purpose computer, a handheld mobile device (e.g., a smart phone), a tablet (e.g., an Apple iPad®), or other communication capable computing device. Software 112 may be a web browser, a dedicated app or other type of software application running either fully or partially on calling system 110.

Calling system 110 may communicate over a network 130 (or over a direct communication channel) to access or register data on block chain system 140 or to access services provided by a receiving system 120. Depending on implementation, block chain system 140 may be local to, remote to, or embedded in one or more of computing systems 110 or 120 or implemented over an independently operated computing platform (not shown). A server system 122 may be configured on receiving system 120 to service one or more telephony or communication requests submitted by calling system 110 or software 112 via network 130. Network 130 may be implemented over a local or wide area network (e.g., the Internet).

Receiving system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components, over server system 122 may also define a special purpose machine that provides remotely situated client systems, such as calling system 110 or software 112, with access to a variety of data and services such as managing a secure communications environment that may be utilized to authenticate the identity of an unidentified party using calling system 110, as provided in further detail herein.

Figure 2:
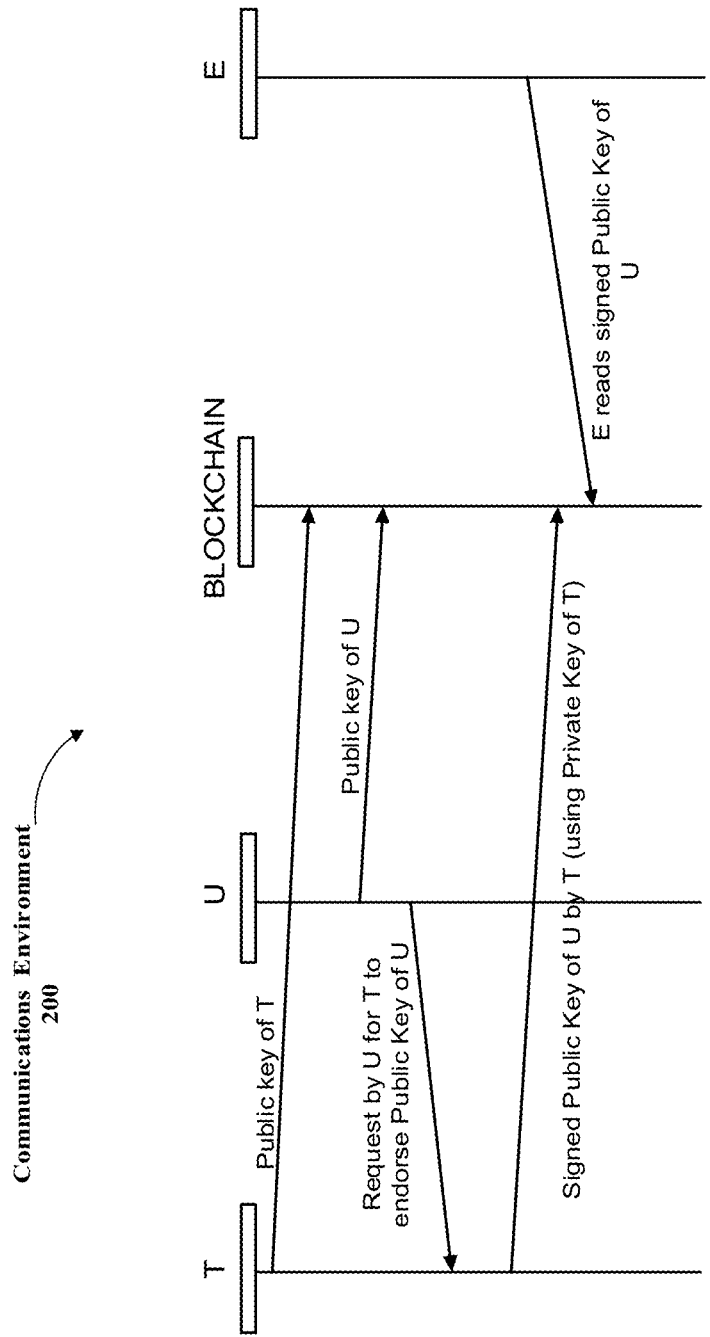
FIG. 2 is an example communications environment event diagram, in accordance with one or more implementations, illustrating a set of events involving the identification of an unidentified party.

In accordance with one or more implementations, the provided services by the special purpose machine or software 124 may include providing a user, using calling system 110 or software 112, with a communications environment, such as that illustrated in FIG. 2, wherein an unidentified party U may be identified as trustworthy based on a series of events involving the communication of a trusted party T with a block chain system 140. In one example scenario, call receiving party E may trust U by way of authenticating the identity of U based on an endorsement by a trusted party T, as provided in further detail herein.

The verification and authentication processes, in accordance with one aspect, may be automated in a secure environment such that the processes involving the identification and endorsement of E may be implemented using asymmetric cryptography, for example. Desirably, identity of E may be represented by a public key and the endorsement may be in the form of a digital signature applied to the public key. Data related to identities and endorsements may be managed by blockchain system 140, which may be a set of consecutively linked and verifiable digital records shared in the form of an immutable ledger. In certain embodiments, additional functionalities may be implemented to verify the signature or prepare the endorsement.

In accordance with example embodiments, blockchain system 140 may be implemented as a growing list, sequence or chain of records (i.e., a chain of blocks or blockchain). The relationship or links connecting the blocks in the chain may be based on a cryptographic calculation. A block may include, for example, a cryptographic hash of the previous block, a timestamp, and transaction data (e.g., represented as a Merkle tree root hash). The blockchain may be advantageously implemented to be resilient (e.g., resistant to modification of data stored in the blocks) unless a set of checks and balances, defined by a collectively accepted policy, is satisfied.

Furthermore, blockchain system 140 may be an open, distributed ledger that may be used to record transactions between two or more parties efficiently and in a verifiable and permanent manner. This goal may be accomplished by, for example, managing the blockchain in a peer-to-peer network that collectively adheres to a protocol for inter-node communication and validation. For example, when data is recorded in a block, the recorded data may not be altered retroactively without alteration of all subsequent blocks, which would require consensus of, for example, a majority of peers in the blockchain system 140.

Accordingly, data stored in blockchain system 140 may be secured by way of distributing the authorization mandates or policies among a wide group of peers (e.g., computing system) that have a high tolerance against failure or corruption. Such decentralized approach for the purpose of authentication and verification of changes to data written to blockchain system 140 is advantageous in that such decentralization may substantially reduce the chances for a successful attack, because authentication would require a consensus among a certain number (e.g., a majority) of the computing peers in the blockchain system 140 versus a few authentication points in the conventional centralized authentication mechanisms that are prevalent in traditional communication systems.

In one example, blockchain system 140 may be implemented as a decentralized data collection and data processing mechanism to enforce a level of trust among users (e.g., receiving party E, unidentified party U) that communicate with each other. More particularly, blockchain system 140 may be utilized as an intermediary data management resource to, for example, store information about identity of parties and provide the stored identity information (e.g., a public key) to a trusted authority T that is configured to authenticate the identity of U. The authentication may be performed by T, by issuing a certificate of authority (e.g., by generating a digital signature or certificate using U's public key, and further signing U's public key with T's private key), which is preserved in blockchain system 140. The digital signature may be verified by E, using the public key of T, as provided in further detail herein.

Figure 3:
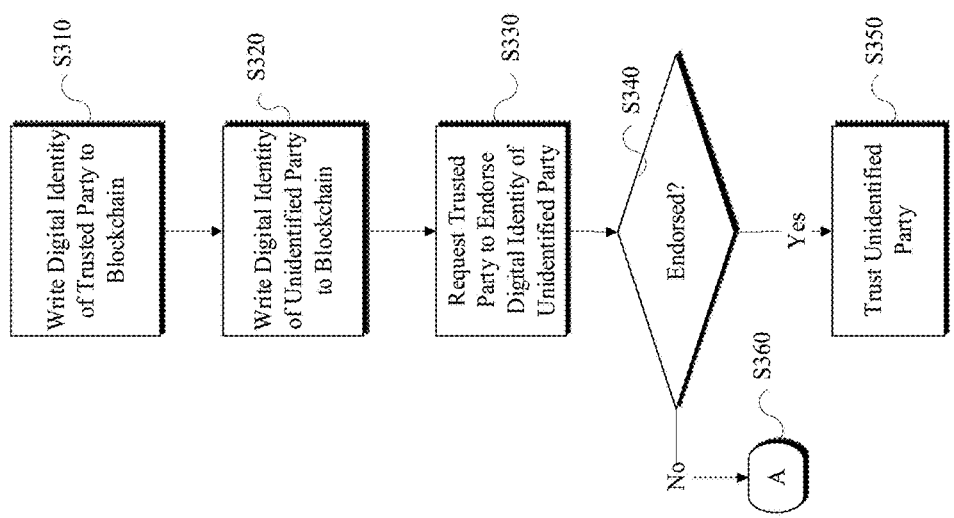
FIG. 3 is an example flow diagram of a method for authentication and identification of an unidentified party, in accordance with one embodiment.

Referring to FIGS. 2 and 3, digital identity of T (e.g., a trusted organization, individual or other entity or party) may be stored in blockchain system 140 (S310). Digital identity of T may be an encrypted public key, for example. The encrypted public key may be generated by, for example, an asymmetric cryptographic algorithm. In some implementations, a public key infrastructure (PKI) based on a set of roles, policies, and procedures may be used to create, manage, distribute, use, store, and manage public key encryption or revoke associated digital certificates. Thus, the PKI may be used as an arrangement to associate public keys with respective identities of entities (e.g., E, U and T).

The association of identities to public keys may be established through a process of registration and issuance of certificates by, for example, a certificate authority (CA). Depending on the assurance or security requirements, the association may be implemented by an automated process as provided in further detail herein. A registration authority (RA) may be implemented to assure valid and correct registration of identities, for example, and may be also responsible for accepting requests for digital certificates and authenticating unidentified parties. In the scenario illustrated in FIG. 2, T may be the entity that performs the duties of the RA, for example.

In accordance with one or more aspects, U may be uniquely identifiable within each CA on the basis of information provided about U (e.g., based on U's public key). A third-party validation authority (VA) may be used to provide such unique identifying information on behalf of U. In the context of the above verification infrastructure, blockchain system 140 may provide a shared and immutable source for storing verified or verifiable identity information (e.g., public keys) for one or more unidentified parties U.

Referring back to FIGS. 2 and 3, for U to be endorsed by T, digital identity of U (e.g., U's public key) may be written to blockchain system 140 (S320). U may submit a request for T to endorse digital identity of U (S330). In example embodiments, U's identity may be authenticated or verified, in response to determining whether T has endorsed U as trustworthy (S340). The authentication or verification of U's identity may be accomplished by, for example, T using T's private key to sign U's public key as available from records stored in blockchain system 140, and desirably registering the signed public key of U as a digital signature in blockchain system 140. As such, if U's identity is endorsed by T, a party E which trusts T, may also trust unidentified party U (S350). Otherwise, if blockchain 140 does not include the public key of U as signed by T, authentication of U fails (S360).

In some implementations, T's public key may be recorded in blockchain system 140 in advance and E may be provided with T's public key by way of accessing the records stored in blockchain system 140. When U, with an unknown identity, registers U's public key on the blockchain 140, E may be able to verify U's identity, if T's private key is used to create a digital signature of U's public key, and E is able to decrypt the digital signature using T's public key to verify U's public key. In one example, T may be an organization, E may be an employee of the organization, and U maybe an external entity to the organization. If the organization or a proxy for the organization acts as a certificate authority and signs U's public key onto the blockchain system 140, E may be able to trust U, because a trusted entity (e.g., the organization) has signed U's public key.

In one aspect, a data structure, including one or more fields (e.g., Flag, Public key, and Signature), may be utilized to endorse or revoke an endorsement of U's identity. "Flag" value may be set to a value (e.g., 0 or 1). For example, a flag value of "1" may indicate endorsement, and a flag value of "0" may indicate revocation of the endorsement. In one example embodiment, a data structure stored in the blockchain (e.g. the last submitted a data structure) may be considered as the latest status of U's identity. It is noteworthy that other fields or other field values may be utilized to implement the above data structure, and that the example name fields or example values provided herein should not be construed to narrowly define the scope of the disclosed subject matter.

Thus, depending on implementation, one or more additional fields (e.g., an expiration field) may be added to the above-noted data structure to help improve the functionality of the endorsement data structure, so that identities that have been endorsed may expire after the passage of certain amount of time. As another example, a field may be included in the data structure that points to one or more previously signed endorsements or revocations, for an identity previously record in the blockchain, to cause the preservation of historical identity data for a target entity.

Figure 4:
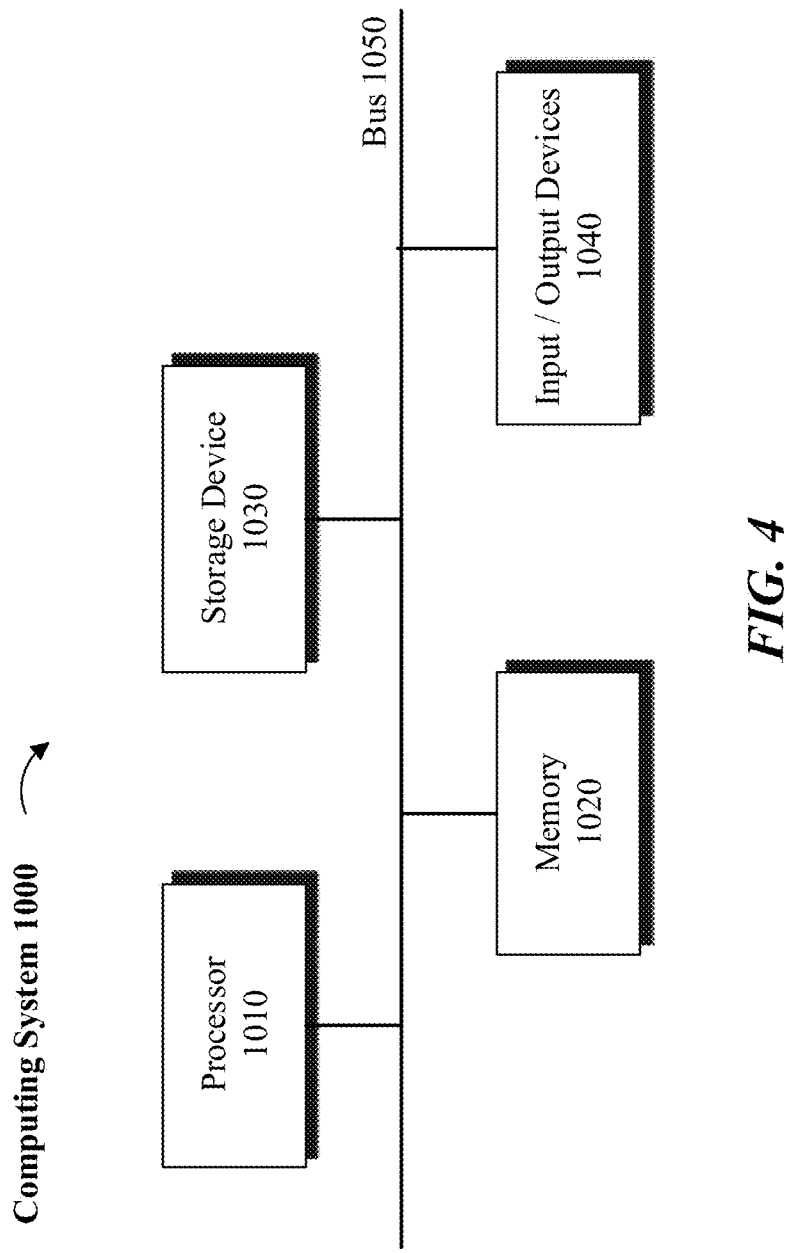
FIG. 4 is a block diagram of a computing system 1000 consistent with one or more embodiments.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method comprising:
   receiving a request to establish a communications connection between a first entity and a second entity in a telephony environment;
   writing a first digital identity associated with the first entity to a first data block in an immutable chain of blocks, in response to determining that the first entity is recognizable as a trusted entity, the blocks being associated according to a defined cryptographic relationship; and
   writing a second digital identity associated with the second entity to a second data block in the immutable chain of blocks, in response to determining that the second entity is unrecognizable as a trusted entity,
   the first entity being configured to receive a request to verify whether the second entity is trustworthy,
   the first entity being configured to verify trustworthiness of the second entity by way of endorsing the second digital entity written to the second data block,
   the endorsing comprising digitally signing the second digital identity with a private key of the first digital entity.

2. The method of claim 1, wherein the immutable chain of blocks includes a blockchain that is managed by a set of policies adhered to by a decentralized group of computing peers, such that changes to data stored in at least the first data block and the second data block requires at least a partial consensus among the decentralized group of computing peers.

3. The method of claim 1, wherein the first digital identity comprises a public key of the first entity.

4. The method of claim 1, wherein the second digital identity comprises a public key of the second entity.

5. The method of claim 2, wherein the endorsing causes a copy of the digitally signed second digital identity to be written to the blockchain.

6. The method of claim 5, wherein a third entity determines the second entity is trustworthy by examining the copy of the signed second digital identity written to the blockchain.

7. The method of claim 6, wherein the examining by the third party comprises verifying the second digital identity signed by the private key of the first entity is decryptable using the first digital identity.

8. The method of claim 7, wherein the third entity determines the first entity is trustworthy by examining the first digital identity written to the blockchain.

9. The method of claim 1, wherein the first digital identity comprises a first public key associated with the first entity and the second digital identity comprises a second public key associated with the second entity, the immutable chain of blocks being managed by a set of policies such that changes to data stored in at least the first data block and the second data block requires at least a majority consensus among a decentralized group of computing entities.

10. The method of claim 9, wherein the endorsing causes a copy of the second public key to be signed by the private key of the first entity and for the signed copy of the second public key to be written to the blockchain, such that a third entity is configured to determine the second entity is trustworthy by examining the signed copy of the second public key written to the blockchain to determine whether the second public key signed by the private key of the first entity is decryptable using the first public key.

11. A computer-implemented system comprising:
at least one programmable processor; and
a non-transitory machine-readable medium storing instructions that, when executed by the at least one programmable processor, cause the at least one programmable processor to perform operations comprising:
receiving a request to establish a communications connection between a first entity and a second entity in a telephony environment;
writing a first digital identity associated with the first entity to a first data block in an immutable chain of blocks, in response to determining that the first entity is recognizable as a trusted entity, the blocks being associated according to a defined cryptographic relationship; and
writing a second digital identity associated with the second entity to a second data block in the immutable chain of blocks, in response to determining that the second entity is unrecognizable as a trusted entity,
the first entity being configured to be able to receive a request to verify whether the second entity is trustworthy, and verify trustworthiness of the second entity by way of endorsing the second digital entity written to the second data block,
the endorsing comprising digitally signing the second digital identity with a private key of the first digital entity.

12. The system of claim 11, wherein the immutable chain of blocks includes a blockchain that is managed by a set of policies adhered to by a decentralized group of computing peers, such that changes to data stored in at least the first data block and the second data block requires at least a partial consensus among the decentralized group of computing peers.

13. The system of claim 11, wherein the first digital identity comprises a public key of the first entity.

14. The system of claim 11, wherein the second digital identity comprises a public key of the second entity.

15. The system of claim 12, wherein the endorsing causes a copy of the digitally signed second digital identity to be written to the blockchain.

16. A computer program product comprising a non-transitory machine-readable medium storing instructions that, when executed by at least one programmable processor, cause the at least one programmable processor to perform operations comprising:
receiving a request to establish a communications connection between a first entity and a second entity in a telephony environment;
writing a first digital identity associated with the first entity to a first data block in an immutable chain of blocks, in response to determining that the first entity is recognizable as a trusted entity, the blocks being associated according to a defined cryptographic relationship; and
writing a second digital identity associated with the second entity to a second data block in the immutable chain of blocks, in response to determining that the second entity is unrecognizable as a trusted entity,
the first entity being enabled to receive a request to verify whether the second entity is trustworthy and verify trustworthiness of the second entity by way of endorsing the second digital entity written to the second data block,
the endorsing comprising digitally signing the second digital identity with a private key of the first digital entity.

17. The computer program product of claim 16, wherein the immutable chain of blocks includes a blockchain that is managed by a set of policies adhered to by a decentralized group of computing peers, such that changes to data stored in at least the first data block and the second data block requires at least a partial consensus among the decentralized group of computing peers.

18. The computer program product of claim 16, wherein the first digital identity comprises a public key of the first entity.

19. The computer program product of claim 16, wherein the second digital identity comprises a public key of the second entity.

20. The computer program product of claim 17, wherein the endorsing causes a copy of the digitally signed second digital identity to be written to the blockchain.

* * * * *